United States Patent [19]
Gartmann et al.

[11] Patent Number: 5,853,482
[45] Date of Patent: Dec. 29, 1998

[54] METHOD AND APPARATUS FOR APPLYING A COATING SOLUTION

[75] Inventors: Uwe Gartmann, Eltville; Hermann Idstein, Oestrich-Winkel; Guenter Hultzsch, Wiesbaden, all of Germany

[73] Assignee: AGFA-Gervaert AG, Leverkusen, Germany

[21] Appl. No.: 699,402

[22] Filed: Aug. 19, 1996

[30] Foreign Application Priority Data

Aug. 19, 1995 [DE] Germany .................. 195 30 516.7

[51] Int. Cl.⁶ .................................................. B05C 3/12
[52] U.S. Cl. .......................... 118/419; 118/407; 118/411; 118/412; 425/72.1; 239/300; 239/566; 239/568; 239/597; 427/286
[58] Field of Search ...................... 118/407, 411, 118/412, 419; 425/72.1; 239/290, 299, 300, 555, 566, 568, 597; 427/286

[56] References Cited

U.S. PATENT DOCUMENTS

| | | | |
|---|---|---|---|
| 3,599,602 | 8/1971 | Krautzberger | 118/410 |
| 4,810,527 | 3/1989 | Geary, Jr. et al. | 427/54.1 |
| 5,114,753 | 5/1992 | Shibata et al. | 118/419 |
| 5,136,972 | 8/1992 | Naka et al. | 118/410 |
| 5,209,410 | 5/1993 | Wichmann et al. | 239/568 |
| 5,354,378 | 10/1994 | Hauser et al. | 118/696 |
| 5,421,921 | 6/1995 | Gill et al. | 156/62.4 |
| 5,421,941 | 6/1995 | Allen et al. | 427/286 |
| 5,429,840 | 7/1995 | Raterman et al. | 427/256 |
| 5,441,204 | 8/1995 | Tappel et al. | 239/708 |
| 5,458,291 | 10/1995 | Brusko et al. | 239/568 |
| 5,486,676 | 1/1996 | Aleshin | 219/121.63 |
| 5,503,336 | 4/1996 | Wichmann | 239/708 |
| 5,525,373 | 6/1996 | Chandler | 118/411 |
| 5,720,820 | 2/1998 | Boger et al. | 118/669 |
| 5,740,963 | 4/1998 | Riney et al. | 239/299 |

FOREIGN PATENT DOCUMENTS

| | | |
|---|---|---|
| 0 057 513 A2 | 8/1982 | European Pat. Off. . |
| 0 104 089 A1 | 3/1984 | European Pat. Off. . |
| 0 595 295 A1 | 5/1994 | European Pat. Off. . |
| 1 908 163 | 9/1970 | Germany . |
| 834 413 | 5/1960 | United Kingdom . |

*Primary Examiner*—Peter Chin
*Assistant Examiner*—Michael P. Colaoanni
*Attorney, Agent, or Firm*—Foley & Lardner

[57] ABSTRACT

Apparatus and method for applying a coating solution to a running substrate using a slot die having two die lips forming a gap therebetween. The gap also defines an outlet for releasing the coating solution to the substrate. The lips have plurality of manifold chambers communicating with gas feeder and coating solution feeder provided in the die lips. The manifold chambers communicate with the outlet. The width of the coating solution is adjustable with the gas pressure applied to the gas feeder.

18 Claims, 6 Drawing Sheets

METHOD AND APPARATUS FOR APPLYING A COATING SOLUTION

BACKGROUND OF THE INVENTION

1. Field of the Invention

The invention relates to an apparatus for applying a coating solution to a running substrate, with optionally adjustable width of the coating solution on the substrate, applied by a slot die. The invention also relates to a method employing such an apparatus.

2. Description of Related Art

In the field of application technology for hot-melt adhesives, width-adjustable slot dies which operate with a spindle adjustment for variable coating widths or with segmented dies for staged widths are known.

A coating head for applying coating compound to running webs, in particular paper webs, with optionally adjustable coating width, measured transversely with respect to the web, is described in DE-A -19 08 163. Underneath the web there extends transversely with respect to the web a pressurized container, which has a coating compound connection to which there is connected a die which has two lips arranged transversely with respect to the web as well as two side walls. At least one of the two lips has at least one end of the die cutouts for reducing the build-up height. These cutouts are controlled by a slide, which has a transverse wall which is arranged parallel with respect to the side wall of the die, is shaped in a way corresponding to the die cross section and, in the closed position of the slide at maximum coating width, is in bearing contact, for instance against the side wall of the die. The outer surface of the transverse wall of the slide is adjoined by a baffle wall for shielding the web against marginal flows emerging from the die when the transverse wall is retracted.

If coating is to be performed with maximum coating width, the slide is brought into its outermost position, in which it covers the cutouts and bears with its transverse wall against the relevant side wall of the die. The coating compound accordingly cannot emerge from the die at the lower edges of the cutouts but instead flows over the entire die length, measured transversely with respect to the web, upward to the height of the web. If, on the other hand, coating is to be performed with reduced coating width, the slide is pushed in, so that it partially or—with the slide pushed in completely—fully exposes the cutouts, and allows a part of the coating compound flow corresponding to the length of the exposed cutouts to emerge from the die over the lower edges of the cutout.

This coating system consequently comprises a die with a manifold chamber and a narrowing die gap, which reaches over the entire coating width, and an adjusting arrangement, which comprises two side walls and a limiting transverse wall. This system operates only in the 6 o'clock position, i.e., the coating solution is applied from below to a web running over a roller. The application solution emerges from the narrowing gap over the entire width of the die and is guided onto the web only in the region of the adjusting arrangement. In the free die region, which is not covered by the adjusting arrangement, the application solution emerges unhindered to both sides, without touching the web, and is collected in a pan.

In the case of a known die for the application of solvent-containing cold glue, the flow chamber is subdivided into a plurality of mutually independent segments. The solvent-containing cold glue is fed individually to the segments of the flow chamber via adjustable, pneumatic cut-off valves. The emergence from the individual segments of the flow chamber is carried out separately up to the mouth of the flow gap, so that it is not possible for the cold glue solution to pass over into an adjacent segment.

Continuous die width adjusting systems which operate with a hydraulically continuously adjustable piston as the width limitation are accompanied by sealing problems and are structurally very complex, since the piston usually also has to be adjusted by means of a spindle. When coating with viscous adhesive coating means, for a width change the slot die has to be completely opened, cleaned and adjusted by inserts to the new coating width, so that only discontinuous operation is possible.

In particular in the production of photoresists, microfilms, proofing films and printing plates, the coating widths have to be adapted to the changing formats.

SUMMARY OF THE INVENTION

The object of the invention is to provide an apparatus which permits a continuous, automatic and fast adaptation or variation of the coating width to changing formats on a substrate.

It is also an object of the invention to provide an improved method of applying coating solution to a running substrate.

In accordance with the objectives, there is provided an apparatus for applying a coating solution to a running substrate using a slot die. The slot die comprises a pair of die lips. At least one of the die lips has at least one gas feeding means. At least one of the die lips also has at least one coating solution feeding means. At least one of the die lips has at least one manifold chamber communicating with the coating solution feeding means and the gas feeding means. The slot die has an outlet communicating with the manifold chamber for releasing the coating solution. The gas feeding means feeds gas, including air into the manifold chamber.

In one aspect of the invention, there are a plurality of manifold chambers, gas feeding means, and coating solution feeding means, each manifold chamber communicating with the gas feeding means and the coating solution feeding means.

In another aspect of the invention, there are at least two manifold chambers and two gas feeding means, each manifold chamber communicating with one of the gas feeding means, and at least one manifold chamber without the gas feeding means.

In another aspect of the invention, there are a plurality of manifold chambers and a plurality of coating solution feeding means, each manifold chamber being communicating with one or more of the coating solution feeding means.

In an aspect of the invention, the slot die contains a die gap between the die lips and a mask positioned in the die gap, which forms the outlet. The mask has gap limitations and separating webs between the gap limitations, the separating webs lying over separating walls formed between the manifold chambers. The separating webs each have a pointed triangular outline, wherein the points thereof are spaced from the outlet by 1 to 5 mm in the die gap.

In an aspect of the invention, the surfaces defining the die gap or the areas in contact with the coating solution are coated with a material, such as silicone or polytetrafluoroethylene, that does not stick to the coating solution.

In an aspect of the invention, the gas feeding means is adapted to feed a cleaning solution for cleaning the manifold chambers and the outlet.

In an aspect of the invention, the pressure in the gas feeding means is adapted to be adjusted from 0.2 mbar to 1 bar to change the application width of the coating solution.

A method of applying a coating solution to a running substrate according to the invention uses a pair of die lips with a gap therebetween. Gas, which can include air, is introduced through at least one of the die lips. The coating solution is introduced through at least one of the die lips. At least one manifold chamber is provided in at least one of the die lips to communicate the manifold chamber with the gas and the coating solution. The coating solution is released through an outlet communicating with the manifold.

According to an aspect of the invention, the width of the coating solution is adjustable by adjusting the pressure in the gas feeding means from 0.2 mbar to 1 bar.

Further objects, features, and advantages of the invention will become apparent from the detailed description of preferred embodiments that follows.

BRIEF DESCRIPTION OF THE FIGURES

The invention is explained in more detail below with reference to exemplary embodiments represented in the drawings.

DETAILED DESCRIPTION OF THE PREFERRED EMBODIMENTS

Figure 1:
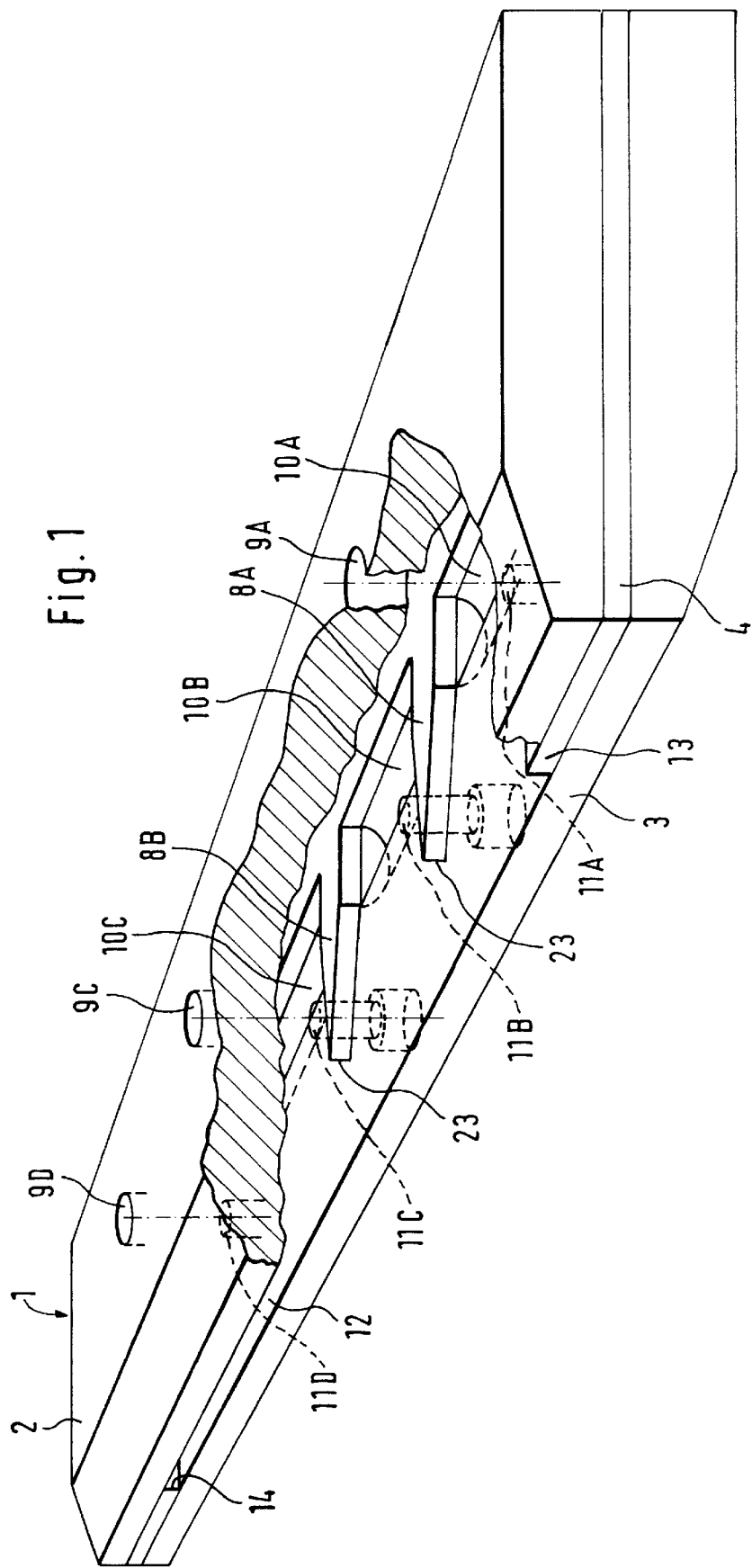
FIG. 1 shows a perspective, partially broken-open view of a first embodiment of a slot die according to the invention.

In the apparatus of the present invention, the slot die contains in one of its two die lips at least one feeding means for gas or air, which is connected to a manifold chamber for the coating solution in the die lip.

In an aspect of the invention there are a plurality of manifold chambers in one of the two die lips and each manifold chamber is connected to a feeding means for gas or air. In a modification of this embodiment of the invention, the two outer manifold chambers are each equipped with a feeding means for gas and air and the inner manifold chambers have no feeding means for gas or air. Expediently, each manifold chamber is connected to a feeding means for the coating solution.

In a further development of the invention there is arranged in the die gap of the slot die a mask which has two gap limitations and separating webs between the gap limitations, the separating webs coming to lie over the separating walls between the manifold chambers.

The invention accomplishes the advantages that the coating solution which, from one of the manifold chambers, enters the coating section, that is the gap region between the manifold chamber and the die gap, is limited there in its lateral extent by the pressure of the gas supplied via the feeding means or the air supplied. By changing the pressure of the gas or of the air, the coating width can be varied in specific regions. Because there are no mechanical wearing parts, operation is largely troublefree.

The invention is explained in more detail below with reference to exemplary embodiments represented in the drawings. These exemplary embodiments are for illustrative purposes only and do not limit the scope of the invention.

The perspective view in FIG. 1 of a first embodiment of a slot die 1, which is partially broken-open, shows the three main component parts of the slot die 1, namely an upper die lip 2, a lower die lip 3 and a mask 4. In the lower die lip 3 there are manifold chambers 10A to 10D (of which only manifold chambers 10A to 10C are shown in FIG. 1), while in the upper die lip 2 there are arranged feeding means 9A to 9D for the coating solution, which are in connection with the manifold chambers. The upper die lip and the lower die lip enclose a die gap 12, in which the mask 4 is arranged. The feeding means 9A to 9D form channels which lie opposite the manifold chambers 10A to 10D. Each of the manifold chambers 10A to 10D in the lower die lip 3 is connected to a corresponding feeding means 11A to 11D for gas or air, these feeding means likewise being arranged in the lower die lip 3.

In modifications of this embodiment, the slot die 1 may contain in one of its two die lips 2 or 3 only one feeding means 11A for gas or air, which is connected to the manifold chamber 10A for the coating solution, while the other manifold chambers are not in connection with such a feeding means for gas or air. Similarly, it is possible that the two outer manifold chambers 10A and 10D are each equipped with a feeding means 11A and 11D, respectively, for gas and air and that the inner manifold chambers 10B and 10C do not have any feeding means for gas or air. The number of manifold chambers is not restricted to four, but depends primarily on the overall width of the slot die 1, the proposed limit for the smallest width dimension of a manifold chamber being not less than 5 mm. In practice, widths of the manifold chambers of between 40 and 80 mm have proved successful. The feeding means 11A to 11D for gas or air are expediently arranged opposite the center of the manifold chambers 10A to 10D. Between the manifold chambers there are separating walls 22A to 22C (cf. FIG. 6).

Figure 7:
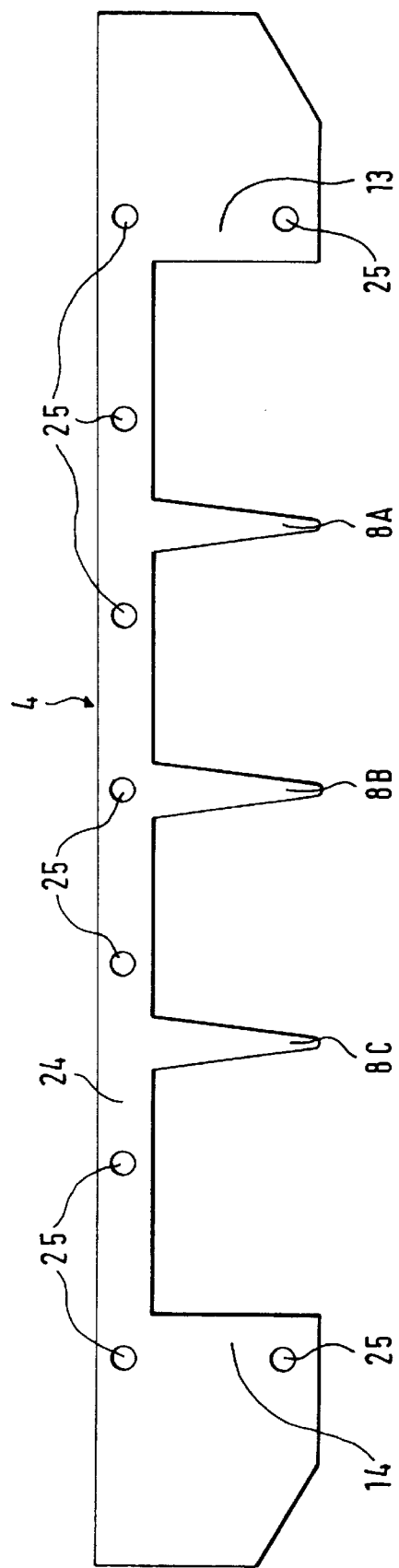
FIG. 7 shows a plan view of a mask of the slot die arranged in the die gap.

As can be seen from FIGS. 1 and 7, the mask 4 comprises a right-hand and left-hand gap limitation 13 and 14, respectively, and separating webs 8A, 8B and 8C. The number of separating webs is in each case one less than the number of manifold chambers. Within the die gap 12, the separating webs 8A, 8B, 8C come to lie over the separating walls 22A, 22B and 22C between the manifold chambers. It can be seen from FIG. 7 that the separating webs have a pointed triangular outline and that, in the gap limitations 13 and 14 and in a connecting part 24 for the gap limitations, holes 25 are arranged, passed through which are screws, not directly shown, which connect the upper die lip and the lower die lip to each other and fix the mask 4 in its position within the die gap 12.

Figure 2:
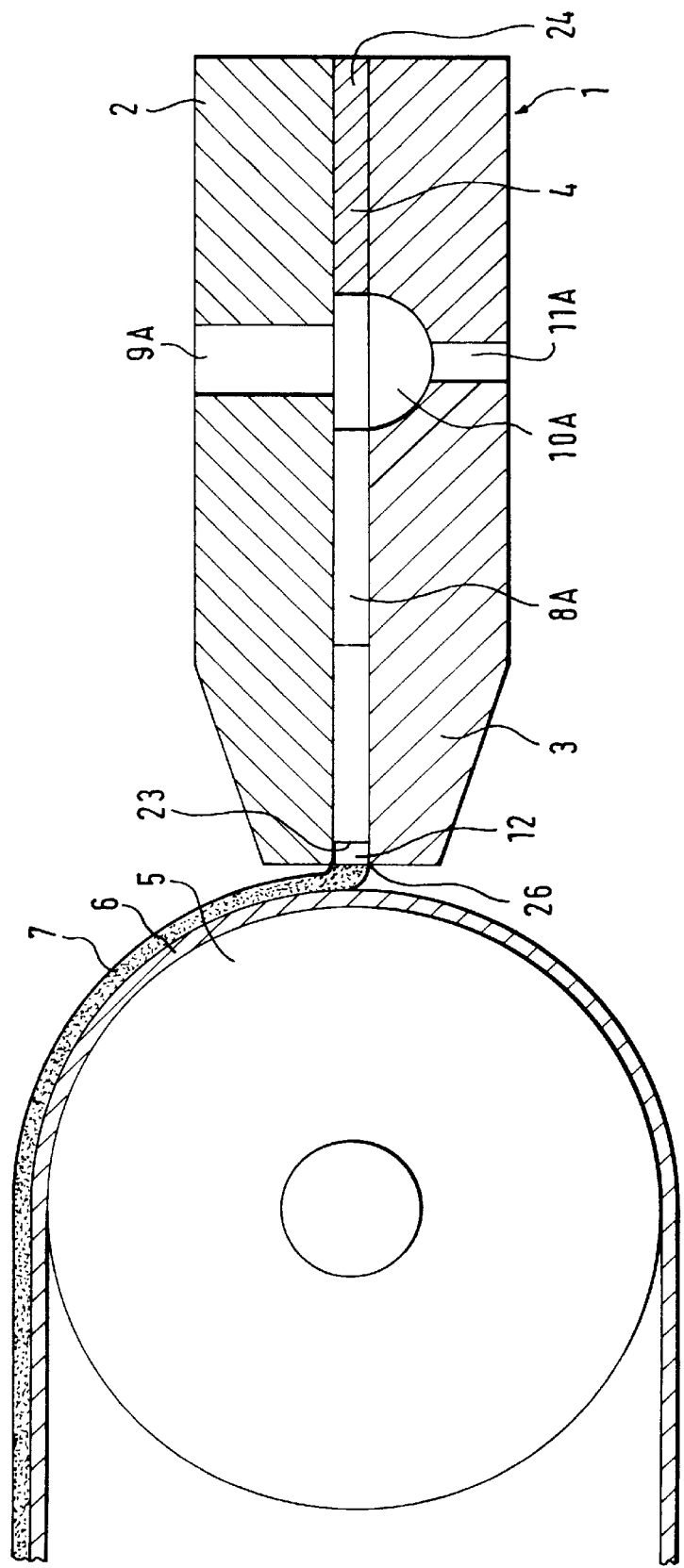
FIG. 2 shows a side view of an application roller, of a coated substrate guided over the application roller and of a second embodiment of the slot die in section.
Figure 4:
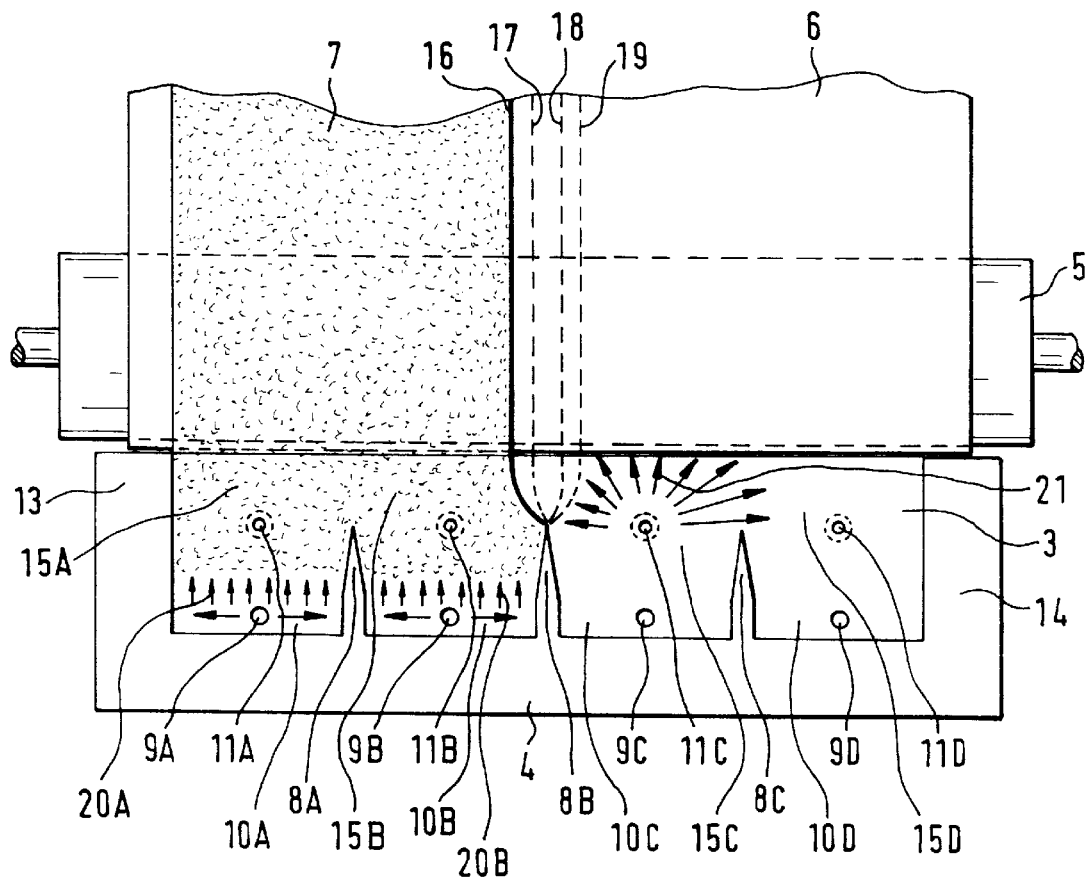
FIG. 4 shows diagrammatically in plan view the application roller and the lower die lip of a cut-open fourth embodiment of the slot die and also the changing of the coating width on the substrate.

Shown in side view in FIG. 2 is an application roller 5, over which a substrate 6 in strip form, for example a strip of aluminum or of one of its alloys, is guided. At a small distance from the application roller 5 there is shown in section the slot die 1, the gap outlet 26 of which is at a predetermined distance from the application roller 5 and the substrate 6. The coating solution emerges from the gap outlet 26 and forms a coating 7 of fixed width on the substrate 6. As FIG. 2 reveals, points 23 of the separating webs 8A to 8C are set back with respect to the gap outlet 26 of the slot die 1 by a specific distance in the die gap 12, this distance being 1 to 5 mm. As is shown in FIG. 4, the separating webs 8A, 8B and 8C are set back with their points respectively by the same distance with respect to the gap outlet. In FIG. 2, the feeding means 9A for the coating solution is located in the upper die lip 2, while the manifold chamber 10A and the feeding means 11A for gas or air are arranged in the lower die lip 3. The slot die 1 in FIG. 2 shows, from left to right within the die gap 12, the gap outlet 26, the separating web 8A and the connecting part 24 of the mask 4, the separating web 8A not being hatched, and the connecting part 24 having a hatching.

Figure 3:
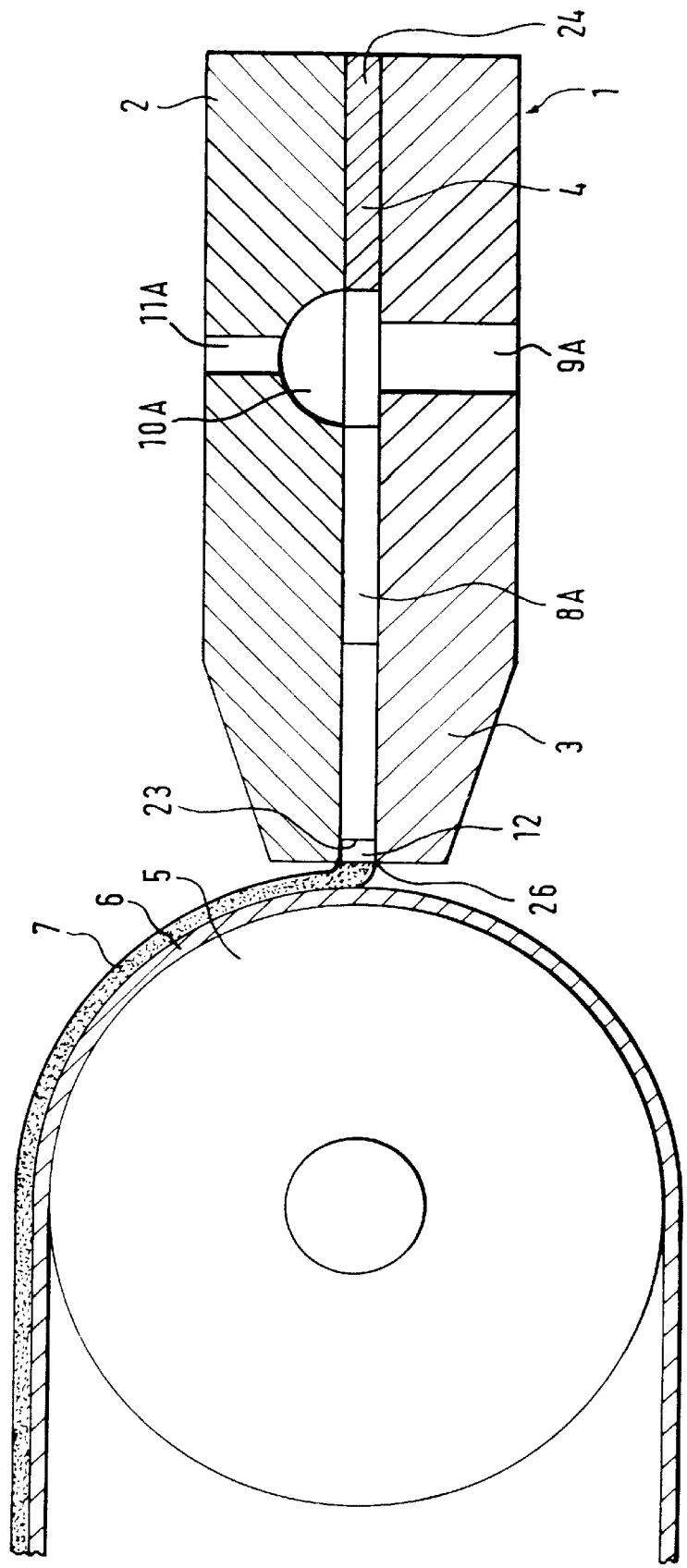
FIG. 3 shows the same side view as in FIG. 2 of a third embodiment of the slot die in section.

In FIG. 3, a further embodiment of the slot die 1 is shown in section, the side view of the application roller 5, of the substrate 6 and of the coating 7 being the same as in FIG. 2. The second embodiment of the slot die 1 differs from the first embodiment, shown in FIGS. 1 and 2, only in that the manifold chambers 10A to 10D are arranged in the upper die lip 2, as are the feeding means 11A to 11D for gas or air to the manifold chambers. Accordingly, the feeding means 9A to 9D for the coating solution are located in the lower die lip 3. The other parts of FIG. 3 correspond to the parts of the same numbering in FIG. 2 and are therefore not described again.

The diagrammatic plan view of the application roller 5 in FIG. 4 and the substrate 6 in strip form, which is guided over the application roller, and of the lower die lip 3 of the cut-open slot die shows hatched the coating 7 and, by solid line, a right-hand edge 16 of the coating 7 and, by dashed lines running parallel thereto, right-hand edges 17, 18, 19 of the coating 7, corresponding to changed widths of this coating. Through the feeding means 9A to 9D, the coating solution flows into the manifold chambers 10A to 10D. In FIG. 4 it is shown for example that coating solution only flows into the manifold chambers 10A and 10B, while the inflow of coating solution to the two other manifold chambers 10C and IOD is shut off. In the two manifold chambers 10A and 10B, the coating solution is distributed over the width of the respective coating section 15A and 15B, the width of the coating section 15A extending from the left-hand gap limitation 13 of the mask 4 to the separating web 8A, while the width of the coating section 15B extends between the two separating webs 8A and 8B.

The coating solution is initially guided laterally by the gap limitation 13 of the mask and the separating webs 8A and 8B. Since the same hydrostatic and hydro-dynamic pressure prevails in the two coating sections 15A and 15B, the coating solutions join at their boundary surfaces and continue to flow together in the direction of the extension of the separating web 8B. At the separating web 8B, the gas emerging from the feeding means 11C, for example air, impinges partly on the meniscus of the coating solution of the coating section 15B. On account of the hydrostatic pressure of the coating solution and the pneumatic pressure of the gas, an equilibrium is established at this point, so that at a predetermined pressure of the gas the right-hand edge 16 of the coating 7 is obtained.

Depending on the pressure level of the gas fed, widths of the coating 7 with the right-hand edges 17 to 19 can be obtained. The edges 17 and 18 correspond to intermediate values of the gas pressure or adjustment pressure. This lies in the range from 0.2 mbar to 1 bar. The arrows 20A and 20B indicate the flows of the coating solutions which are supplied to the manifold chambers 10A and 10B via the feeding means 9A and 9B. The arrows 21 indicate the flow distribution of the gas fed or of the air fed, which enters from the feeding means 11C into the die gap of the slot die 1. In this respect it should also be mentioned that the feeding means 9A to 9D for the coating solution are in fact arranged in the case of the first embodiment in the upper die lip 2, which cannot be seen in FIG. 4. To explain the mode of operation and the flow conditions of the coating solution, the feeding means 9A to 9D, which in fact cannot be seen, are drawn in.

The controlling of the supply of coating solution to the manifold chambers may be performed by needle valves. According to the required width of the coating 7 on the substrate 6, two, three or all four manifold chambers 10A to 10D are charged with coating solution. As already mentioned before, the number of manifold chambers is not in any way restricted to four chambers, but may be fixed according to the requirements for different widths of the coating 7. Changes in the coating width of the coating 7 of ±5 mm per coating section can be achieved, i.e., the distance between the edge 16 and the edge 19 in FIG. 4 then corresponds to 5 mm. By changing the length of the separating webs 8A to 8C, increasing the number of feeding means 11A to 11D for gas or air and by cross-sectional changes of these feeding means, an increase of the adjusting range of the coating 7 can be achieved, so that changes in the coating width of more than 5 mm per coating section 15A to 15D can also be accomplished.

The inner surfaces of the die gap 12 are expediently coated with materials, such as silicone or polytetrafluoroethylene, which have non-adhesive properties with respect to the coating solution. These coating materials for the inner surfaces of the die gap 12 influence or increase the adjusting range for the coating 7. It is also of great advantage that the feeding means 11A to 11D for gas or air can be used as flushing channels for cleaning the slot die 1. By introducing a cleaning solution or flushing liquid into the feeding means 11A to 11D, the manifold chambers 10A to 10D and the die gap 12 are cleaned of residues of the coating solution, without the die having to be opened.

Figure 5:
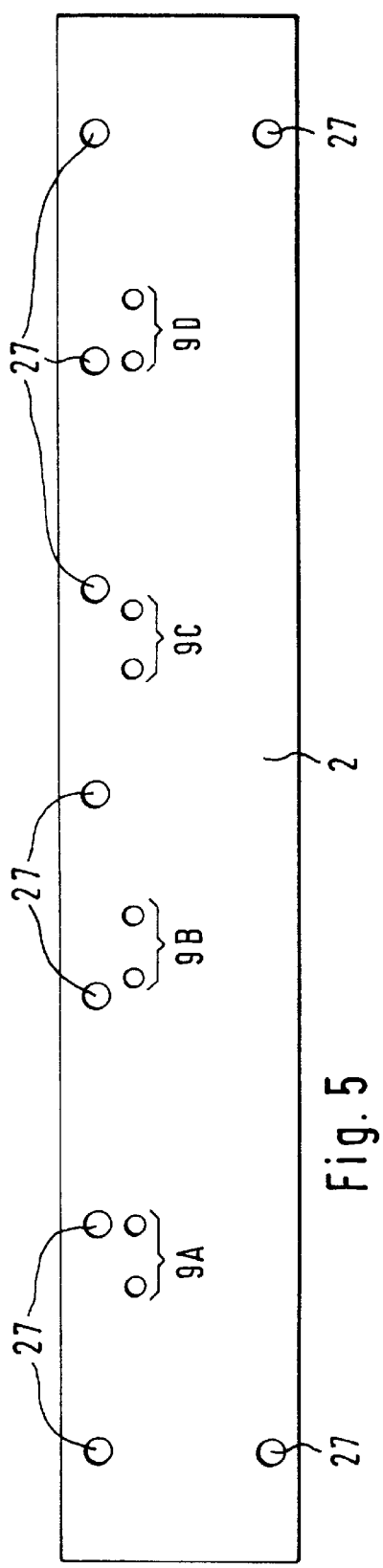
FIG. 5 shows in plan view an upper die lip of the slot die with feeding means for the coating solution.

The plan view of an upper die lip 2 in FIG. 5 shows two respective feeding means 9A, 9B, 9C and 9D for each individual manifold chamber 10A to 10D. Depending on requirements, the coating solution is introduced into the individual manifold chamber via both feeding means, in order to obtain a film thickness of coating solution in the die gap 12 of as uniform a thickness as possible. However, one of the two feeding means per manifold chamber may also be used for deaerating during the charging of the other feeding means with coating solution. In the deaeration of the coating solution, the gas or air bubbles possibly contained in the coating solution then escape from the other feeding means. In the upper die lip 2 there are present along the upper edge and the two side edges holes 27 for receiving screws, by means of which the upper die lip is screwed to the lower die lip.

Figure 6:
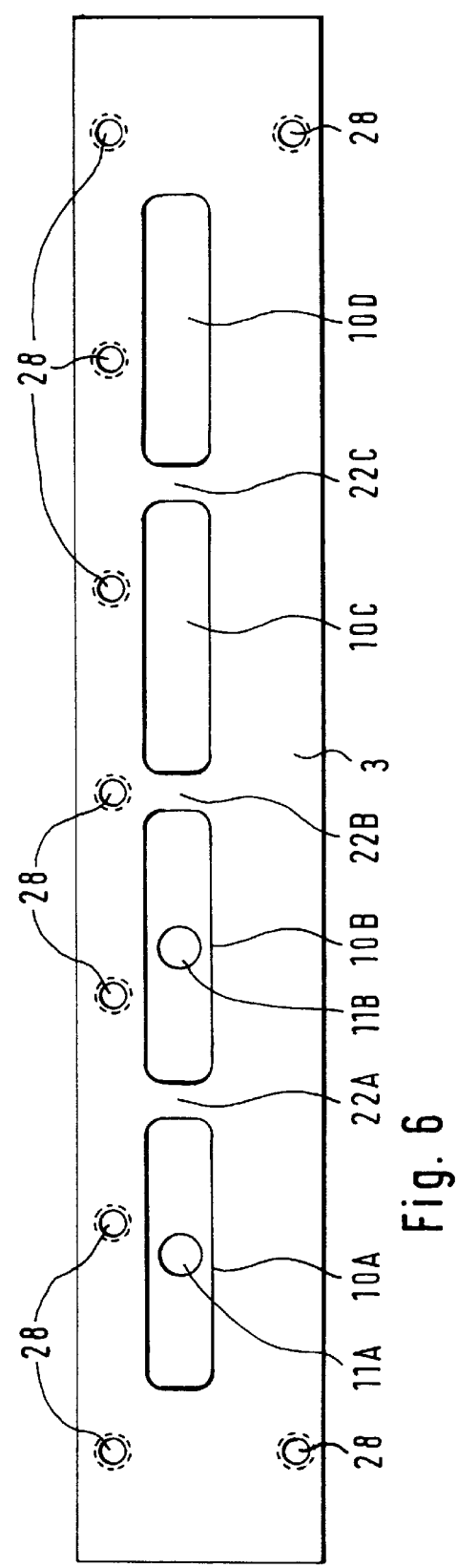
FIG. 6 shows a plan view of the lower die lip with manifold chambers and feeding means for gas or air.

The plan view of the lower die lip 3 in FIG. 6 shows the four manifold chambers 10A to 10D and the separating walls 22A, 22B and 22C between the manifold chambers. Arranged centrally in the two left-hand manifold chambers 10A and 10B are the feeding means 11A and 11B for gas or air. The two other manifold chambers 10C and 10D have for example no such feeding means for gas or air.

Screws, not shown, are screwed into the threaded holes 28, arranged along the upper edge and the side edges of the lower die lip 3, when the upper die lip and the lower die lip are put together and connected to each other to form the slot die.

Similarly, it is possible for the two outer manifold chambers 10A and 10D each to be equipped with a feeding means 11A and 11D, respectively, while the two inner manifold chambers 10B and 10C have no feeding means for gas or air. Furthermore, also of advantageous significance are other arrangements, in which for example three manifold chambers contain feeding means and one manifold chamber contains no feeding means for gas or air, all conceivable combinations of the manifold chambers being possible.

German Application No. 195 30 516.7, dated Aug. 19, 1995 (the priority document of the present application) is hereby incorporated by reference in its entirety.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. An apparatus for applying a coating solution to a running substrate, comprising:

a pair of die lips forming a slot die which contains a die gap between the die lips;

a mask positioned in the die gap, the mask having gap limitations and separating webs between the gap limitations to control a width of coating solution applied on the running substrate, whereby the coating solution is guided laterally by one of the gap limitations and at least one of the separating webs;

gas feeding means in at least one of the die lips;

coating solution feeding means in at least one of the die lips;

at least one manifold chamber in at least one of the die lips and communicating directly with the coating solution feeding means and the gas feeding means; and an outlet at the end of said die gap, said die gap communicating with the manifold chamber for releasing the coating solution on to the running substrate.

2. An apparatus as claimed in claim 1, wherein the gas feeding means is adapted to feed air, into the manifold chamber.

3. An apparatus as claimed in claim 2, wherein at least one of the die lips has a plurality of manifold chambers and a plurality of gas feeding means, each manifold chamber communicating with one of the gas feeding means.

4. An apparatus as claimed in claim 1, wherein at least one of the die lips has a plurality of manifold chambers and a plurality of gas feeding means and wherein two outer manifold chambers are connected to corresponding gas feeding means, while two internal manifold chambers are not provided with gas feeding means.

5. An apparatus as claimed in claim 1, wherein at least one of the die lips has a plurality of manifold chambers and a plurality of coating solution feeding means, each manifold chamber communicating with one or more of the coating solution feeding means.

6. An apparatus as claimed in claim 1, wherein the separatig webs are lying over separating walls formed between the manifold chambers.

7. An apparatus as claimed in claim 6, wherein the die gap forms the outlet, the separating webs each having a pointed triangular outline, wherein the points thereof are spaced from the outlet by 1 to 5 mm in the die gap.

8. An apparatus as claimed in claim 6, wherein inner surfaces defining the die gap are coated with a material that does not stick to the coating solution.

9. An apparatus as claimed in claim 8, wherein the material comprises silicone or polytetrafluoroethylene.

10. An apparatus as claimed in claim 2, wherein the gas feeding means is adapted to feed a cleaning solution for cleaning the manifold chambers and the outlet, which is defined by gap between the die lips.

11. An apparatus as claimed in claim 2, wherein gas pressure in the gas feeding means is adapted to be adjusted from 0.2 mbar to 1 bar to change an application width of the coating solution.

12. A slot die comprising:

a pair of die lips with a gap therebetween;

a mask positioned in the gap, the mask having gap limitations and separating webs between the gap limitations to control a width of a coating solution to be applied on a running substrate, whereby the coating solution is guided laterally by one of the gap limitations and at least one of the separating webs;

gas feeding means in at least one of the die lips;

coating solution feeding means in at least one of the die lips;

at least one manifold chamber in at least one of the die lips and communicating directly with the coating solution feeding means and the gas feeding means; and an outlet at the end of said die gap, said die gap communicating with the manifold chamber.

13. A slot die as claimed in claim 12, wherein at least one of the die lips has a plurality of manifold chambers, a plurality of gas feeding means, and a plurality of coating solution feeding means, each manifold chamber communicating with at least one of the gas feeding means and the coating solution feeding means.

14. A slot die as claimed in claim 13, wherein the separating webs are lying over separating walls formed between the manifold chambers.

15. A slot die as claimed in claim 14, wherein the separating webs each have a pointed triangular outline, wherein the points thereof are spaced from the outlet by 1 to 5 mm in the die gap.

16. A slot die as claimed in claim 12, wherein gas pressure in the gas feeding means is adapted to be adjusted from 0.2 mbar to 1 bar to change an application width of a coating solution exiting the outlet.

17. A method of applying a coating solution to a running substrate, comprising the steps of:

providing an apparatus comprising: a pair of die lips forming a slot die which contains a die gap between the die lips; a mask positioned in the die gap, the mask having gap limitations and separating webs between the gap limitations to control a width of coating solution applied on the running substrate, whereby the coating solution is guided laterally by one of the gap limitations and at least one of the separating webs; gas feeding means in at least one of the die lips; coating solution feeding means in at least one of the die lips; at least one manifold chamber in at least one of the die lips and communicating directly with the coating solution feeding means and the gas feeding means; and an outlet at the end of said die gap, said die gap communicating with the manifold chamber for releasing the coating solution on to the running substrate;

introducing gas through at least one of the die lips;

introducing the coating solution through at least one of the die lips;

communicating at least one of the manifold chambers directly with the gas and the coating solution; and releasing the coating solution through the outlet.

18. A method of applying a coating solution as claimed in claim 17, further comprising the step of adjusting the width of the coating solution by adjusting the pressure in the gas feeding means from 0.2 mbar to 1 bar.

* * * * *